No. 714,751. Patented Dec. 2, 1902.
W. W. SHAW.
HAY TEDDER FORK.
(Application filed May 19, 1902.)
(No Model.)
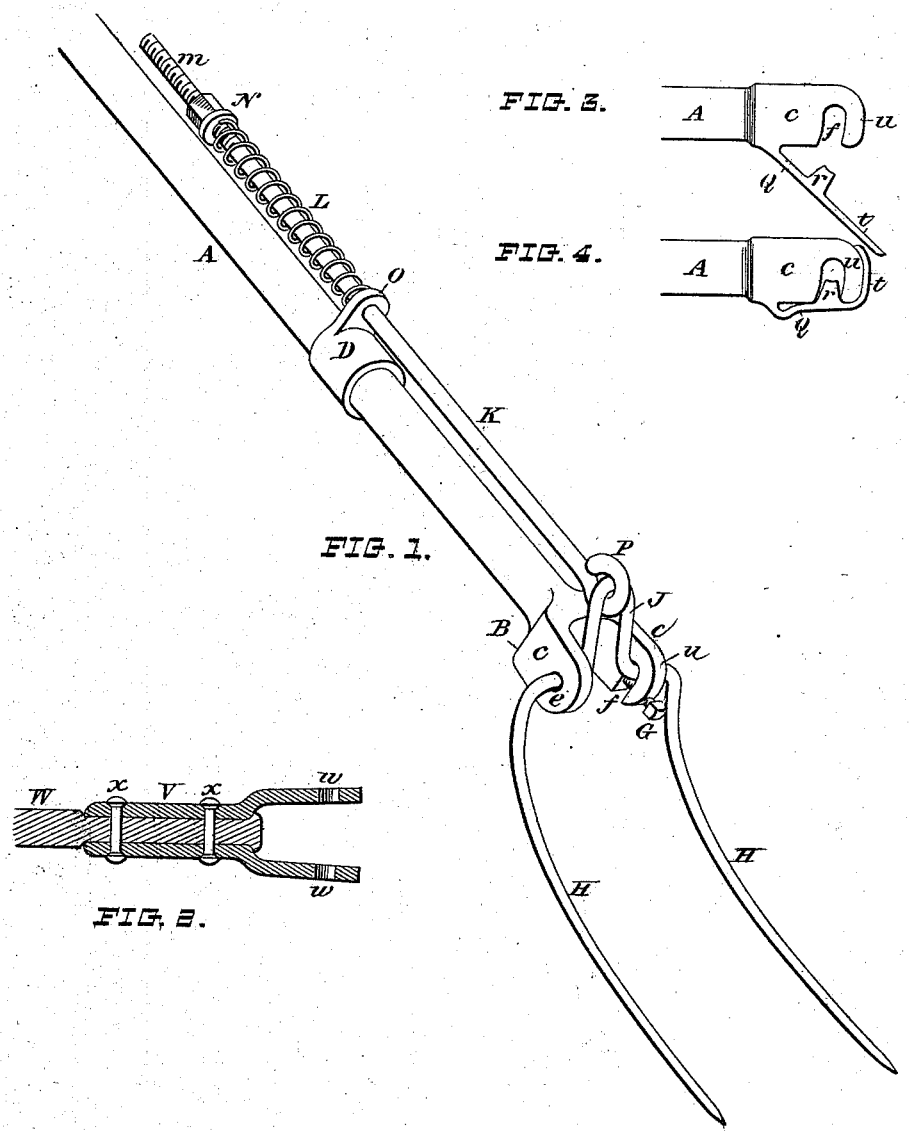
WITNESSES,
Bassel
Charles H. Houghton
INVENTOR,
WILLIAM W. SHAW,
BY Franklin Scott,
ATTORNEY.

UNITED STATES PATENT OFFICE.

WILLIAM W. SHAW, OF HOOSICK FALLS, NEW YORK.

HAY-TEDDER FORK.

SPECIFICATION forming part of Letters Patent No. 714,751, dated December 2, 1902.

Application filed May 19, 1902. Serial No. 108,061. (No model.)

*To all whom it may concern:*

Be it known that I, WILLIAM W. SHAW, of the village of Hoosick Falls, in the county of Rensselaer and State of New York, have invented certain Improvements in Hay-Tedder Forks; and I declare that the subjoined description, in connection with the accompanying sheet of drawings, constitutes a specification thereof.

My invention is applicable to that class of hay-tedders in which the so-called "grasshopper" movement is employed to actuate the fork arms or levers.

It relates to improved means for replacing an old or broken fork with a new one without leaving the field or dismantling the machine in any way.

The invention is fully shown in the drawings, wherein—

Figure 1 shows a perspective view of my improvement. Fig. 2 shows a common mode of constructing the end of the kicker-arm. Figs. 3 and 4 show modifications of the means seen in Fig. 1 for holding the fork in its bearings.

My improvement relates particularly to the construction of the bearings of the kicker-arm of a hay-tedder, whereby if a fork breaks in use and it becomes necessary to replace it with a new one it can be done without cutting or breaking bolts or rivets or in any other way disarranging any of the connected parts of the machine.

The nature of my invention can be best understood by comparing it with an old structure, one of which is seen in Fig. 2. This shows an arm W, to the opposite sides of which cheek-pieces V V are attached by the rivets *x x*. Each of these cheeks has an eye-bearing *w w*, through which the shoulders of the tines of the fork pass and in which the fork turns. The fork used with this arm is the same as that shown in Fig. 1, and the parts are put together by first slipping the cheeks V V over the points of the tines and then bringing them into position on each side of the arm and fastening them with rivets *x x*. When a fork so connected with an arm breaks, it has often been necessary to go to a machine or blacksmith shop, where proper facilities are accessible, cut the rivets with a cold-chisel, remove one of the cheeks and slip it over the end of the tine, when the other could be drawn out of the other cheek. A new one could be then substituted by reversing this process and inserting new rivets and heading them down. All this involved much expense and loss of time from the hay-field. These difficulties I have met and overcome by the use of the appliance shown in Fig. 1. The kicker-arm is shown at A, and it has an integral head B, formed with two cheeks *c* and *c*. An aperture *e* is made through one of these and the other has an open recess *f*, which constitute the bearings for the fork and correspond with the bearings *w w* of the cheeks V V of Fig. 2. After the insertion of the fork H in position the open bearing is closed by the insertion of a bolt or pin G, so that it cannot be displaced in use. The invention resides in making the head integral and constructing one cheek with an open bearing. This open bearing may or may not be closed with a guard to prevent displacement of the fork, as in most cases the retraction of the eyebolt K, which connects with the loop J of the fork, under the action of spring L is sufficient to keep the fork in its bearings.

My solid-head open-cheek improvement permits a great modification in the construction of kicker-arms. The drawings show what may be a tubular arm A, with which the solid head and shank may be connected by a coupling, as at D. This coupling may be provided with an ear O, through which the rod K can pass. This rod is threaded at its upper end to take on the nut N, between which and the ear O is the expansive spring L. Normally the tension of this spring draws the eye P of rod K down against the head B; but in action when the tips of the tines H H catch the ground they turn backwardly, thereby drawing the rod through the ear O and compressing the spring. When the tines are released, the spring acts to retract the loop J, thereby imparting a smart everting stroke to the tines and returning them to their normal position.

In applying my invention to kicker-arms in hay-tedders I do not restrict myself to any special construction of arm or special mode of connecting the fork-head to the arm, as these features may be wrought out in a variety of ways. Neither do I restrict myself to the use of other means to confine the fork in its open bearing than the retractile force of the spring L or its equivalent, nor to but one open bearing in the cheeks, as both may be made open, nor to any particular means for preventing the fork from escaping from its open bearing, as these may be infinitely varied.

To remove the fork from its position in the combination it is only necessary to remove pin G and open the eye P of the bolt K and disconnect it from the fork-loop J. Then the prong of the fork on the side of the open bearing will drop out of that bearing and the other prong may be drawn out of the closed bearing $e$. A new fork can be put in place by reversing this process.

I therefore claim as my invention—

1. An integral fork-head for kicking-arms of hay-tedders, having one open bearing for one prong of the fork, substantially as specified.

2. An integral fork-head for the fork-arm of a hay-tedder, having one open bearing for the insertion and removal of the fork, and means for closing said opening to prevent accidental displacement of the fork, substantially as specified.

3. The combination of the arm A and fork H, with the integral fork-head B having cheeks $c\ c$, for bearings, one of which, $f$, is open and means for closing said open bearing, substantially as specified.

4. A fork-head of the character described having two bearings for the fork-prongs, one of which is open, and a lip, cast integral with the head and adapted to be bent down across the open bearing to close the same, substantially as specified.

In testimony whereof I have hereunto subscribed my name, this 15th day of May, A. D. 1902, in the presence of two witnesses.

WILLIAM W. SHAW.

Attest:
FRANKLIN SCOTT,
THOMAS F. RING.